United States Patent [19]

Mühleck et al.

[11] Patent Number: 5,672,884
[45] Date of Patent: Sep. 30, 1997

[54] MODULAR PHOTO INTERRUPTERS MANUFACTURED ON MOUNTING STRIPS

[75] Inventors: Peter Mühleck, Offenau; Heinz Nather, Untergruppenbach, both of Germany

[73] Assignee: Temic Telefunken microelectronic GmbH, Heilbronn, Germany

[21] Appl. No.: 553,094

[22] Filed: Nov. 3, 1995

[30] Foreign Application Priority Data

Nov. 8, 1994 [DE] Germany ............ 44 39 838.7

[51] Int. Cl.⁶ ........................................... G02B 27/00
[52] U.S. Cl. ........................ 250/551; 250/239; 257/82
[58] Field of Search ....................... 250/551, 239; 257/81, 80, 82, 448

[56] References Cited

U.S. PATENT DOCUMENTS

| | | | |
|---|---|---|---|
| 4,633,582 | 1/1987 | Ching et al. | 29/827 |
| 5,093,879 | 3/1992 | Bregman et al. | 385/93 |
| 5,291,038 | 3/1994 | Hanamoto et al. | 257/82 |
| 5,436,472 | 7/1995 | Ogawa | 257/82 |
| 5,567,953 | 10/1996 | Horinouchi et al. | 250/551 |

FOREIGN PATENT DOCUMENTS

| | | |
|---|---|---|
| 0485968 | 5/1992 | European Pat. Off. . |
| 1146200 | 3/1963 | Germany . |
| 2339575 | 2/1975 | Germany . |
| 2348900 | 4/1975 | Germany . |
| 2654402 | 6/1978 | Germany . |
| 2844869 | 4/1979 | Germany . |
| 3008309 | 9/1981 | Germany . |
| 3004691 | 12/1982 | Germany . |
| 3223272 | 12/1983 | Germany . |
| 3806881 | 9/1989 | Germany . |

*Primary Examiner*—Edward P. Westin
*Assistant Examiner*—Alan L. Giles
*Attorney, Agent, or Firm*—Spencer & Frank

[57] ABSTRACT

A photo interrupter which features at least one transmission element and at least one receiver element separated by an optical transmission path. To ensure a flexible structure with variable characteristics, the photo interrupter features a modular structure comprised of two joinable housing parts. In order to reduce production costs and simplify the production process, the housing parts of the photo interrupter respectively feature one carrier unit each which is designed as a panel of a mounting strip, as well as at least one semiconductor device located on the carrier unit, and a housing body forming the two side surfaces of the photo interrupter, which housing body—in a first partial area of the carrier unit containing the semiconductor device(s)—encloses the carrier unit; at least one semiconductor device of the one housing part will be a transmission element, and at least one semiconductor device of the other housing part will be a receiver element. To enable easy assembly of the two housing parts, at least one of the two housing parts features a connecting part which is mounted on the housing body and forms the base area of the photo interrupter; this connecting part provides a flush joint for the two housing parts.

16 Claims, 3 Drawing Sheets

MODULAR PHOTO INTERRUPTERS MANUFACTURED ON MOUNTING STRIPS

DESCRIPTION OF THE PRIOR ART

Today, photo interrupters are used in many applications such as e.g. for the detection of objects and/or the position of objects, in light barriers, or for digital counting operations. Photo interrupters are comprised of at least one transmission element and at least one receiver element, which are both integrated in a common plastic material housing and separated from each other by means of an optical transmission path. The transmission between transmission element(s) and receiver element(s) will in most cases be effected within the infrared band. If an object is inserted into the optical transmission path, the light path between transmission element and receiver element will be partially or completely interrupted and thus the reception signal reduced, and this fact can then be evaluated by a subsequent processing unit. For manufacturing photo interrupters, either housed or unhoused semiconductor devices (transmission element and receiver element) will be mounted inside a U-shaped plastic material housing and encapsulated therein, or the semiconductor devices will be placed inside an injection mold with subsequent injection of the plastic housing material to form the required housing shape. The disadvantage here is that housing shapes and thus the properties of the photo interrupter will be fixed, allowing variation only with great difficulty, and that the manufacturing process is very cost and labor intensive and cannot be fully automated.

SUMMARY OF THE INVENTION

The object of the invention is to provide for a photo interrupter which can be manufactured easily and at low cost, and which features a flexible structure complete with variable properties. The above object is achieved by the photo interrupter according to the invention as defined in the independent claim. Advantageous further applications and versions of the invention will be achieved in accordance with the relevant sub-claims.

The photo interrupter presented here features a modular structure comprising two joinable housing parts, each containing a carrier unit as a component part of a mounting strip. In a first and centrally located partial area of the carrier unit, at least one unhoused semiconductor device, for instance, a semiconductor chip or SMD (surface mounted device) will be fitted to the mounting strips, and the mounting strip in this partial area of the carrier unit completely encapsulated by a housing material (e.g. plastics material). In a second partial area and a third partial area of the carrier unit, the mounting strip will extend sideways, in one direction each, away from the first, centrally located partial area, with the second partial area of the carrier unit being used to influence the optical characteristics of the semiconductor device(s) for the respective housing part, in that this second partial area features one or more recesses which, for instance, will be positioned as a screen in front of the semiconductor device (s) by bending the partial area or carrier unit; the third partial area of the carrier unit is used to make the electric contacts of the semiconductor device(s) for the respective housing part, in that this third partial area of the carrier unit is equipped with strips forming the contact legs of the housing part or photo interrupter. Populating the carrier units of the two housing parts with semiconductor devices can be done flexibly, with at least one transmission element being assigned to the one housing part and at least one receiver element being assigned to the other housing part. Thus, for instance, the one housing part may feature two transmission elements and the other housing part two receiver elements, or both housing parts comprise one transmission element as well as one receiver element, or the one housing part contains one transmission element but the other housing part two receiver elements. The two housing parts will be joined via a connecting part which is fitted to at least one of the housing parts and comprises at least one connection element. In this regard, joining the two housing parts via this (these) connection element(s) of the connecting part(s) can be effected, for instance, by gluing, soldering, snapping (spring locks) or plugging (plug-in connection). If one housing part comprises more than one semiconductor device, these may be separated from each other by means of an optical partition of the housing body in order to avoid mutual interference.

The photo interrupter presented here integrates several advantages:

Due to its modular structure, consisting of the two housing parts, the number of transmission elements and receiver elements may be freely selected according to actual requirements; this modular structure also allows transmission elements and receiver elements to be variably combined in their arrangement. With regard to their properties, the individual housing parts may already be characterized in the same way as for later photo interrupter operation; thus, they are easy to detect and test by measurement technology. The assignment of the two housing parts may be effected flexibly using certain characteristics or (—in particular—optical) properties.

Due to the housing parts being set up by means of strip technology on the mounting strip as a carrier unit, simple and automatic production has become possible; this production can thus be effected at low cost, by machine, and without the need for any manual process stages; the two housing parts may either be set up on single partial areas of the mounting strip and then assembled, or the housing parts will be set up on mounting strips which are assembled and then separated into single partial areas. As the recesses, as screens, and the strips, as contact legs, are already integrated into the carrier unit, these can be manufactured by machine and with a high degree of positioning precision. For instance, mounting strips may be fitted to rollers, where different rollers may comprise housing parts with, respectively, different numbers and arrangements of semiconductor devices. If SMD components are used as semiconductor devices, the existing SMD technology can be fully integrated into the production process.

The characteristics of the photo interrupter can be varied flexibly and in many ways. The distance between transmission element and receiver element (i.e., the optical path) can be altered either by inserting a spacer between the two housing parts or by varying the connecting part or parts (and their connection elements). By integrating optical auxiliary devices (such as lenses, for instance) into the mounting strip recesses, the (optical) characteristics of the screens may be modified; the form of the recesses, and thus the form of the screens, may be variably predefined: either by follow-on processing of the mounting strip in the second partial area of the carrier unit or by specifying the required structure for the second partial area of the carrier unit when producing the mounting strip. By appropriate specification of the housing body—for example, by selecting different (plastic) materials for the different housing parts or by different coloring or painting of housing parts (it is recommended, for instance, to use white coloring for a housing part comprising transmission elements, in order to increase light emission, and black coloring for a housing part containing receiver elements, in order to suppress extraneous or stray light)—, the optical characteristics of the photo interrupter may be preset.

BRIEF DESCRIPTION OF THE DRAWINGS

The invention will be further elucidated by means of the drawing, using FIGS. 1 to 6, which shows a photo interrupter assembled from two housing parts, complete with one transmission element and two receiver elements. FIGS. 1 to 4 show various different stages in the production process of the photo interrupter, while

DESCRIPTION OF A PREFERRED EMBODIMENT

Figure 1:
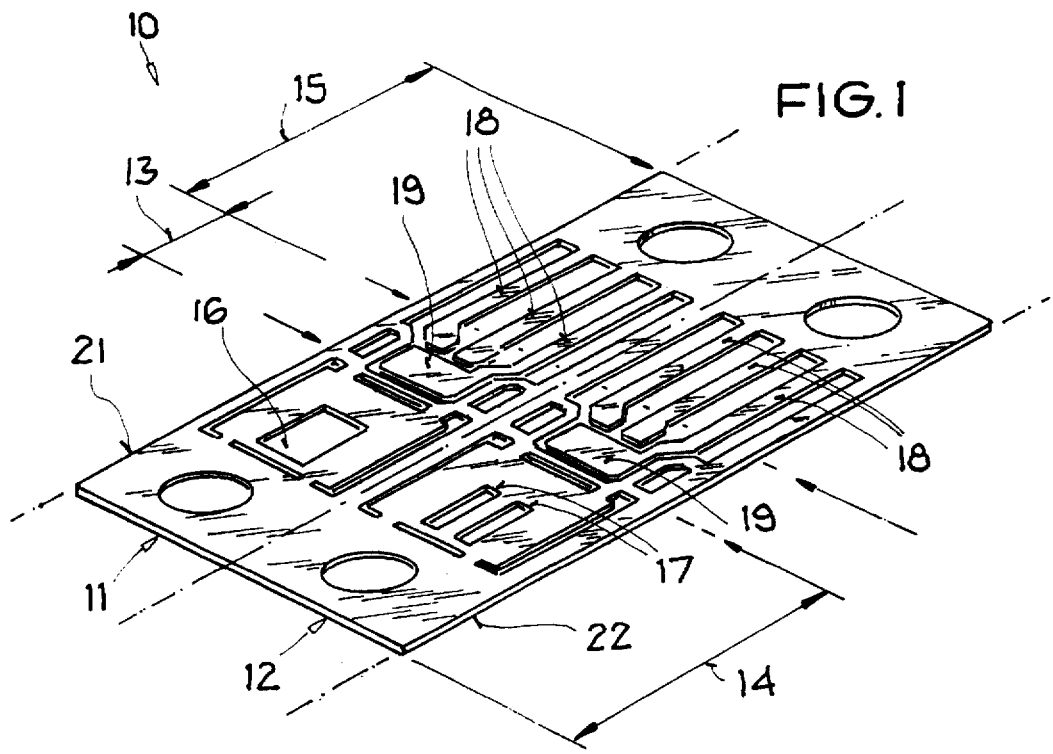
Figure 2:
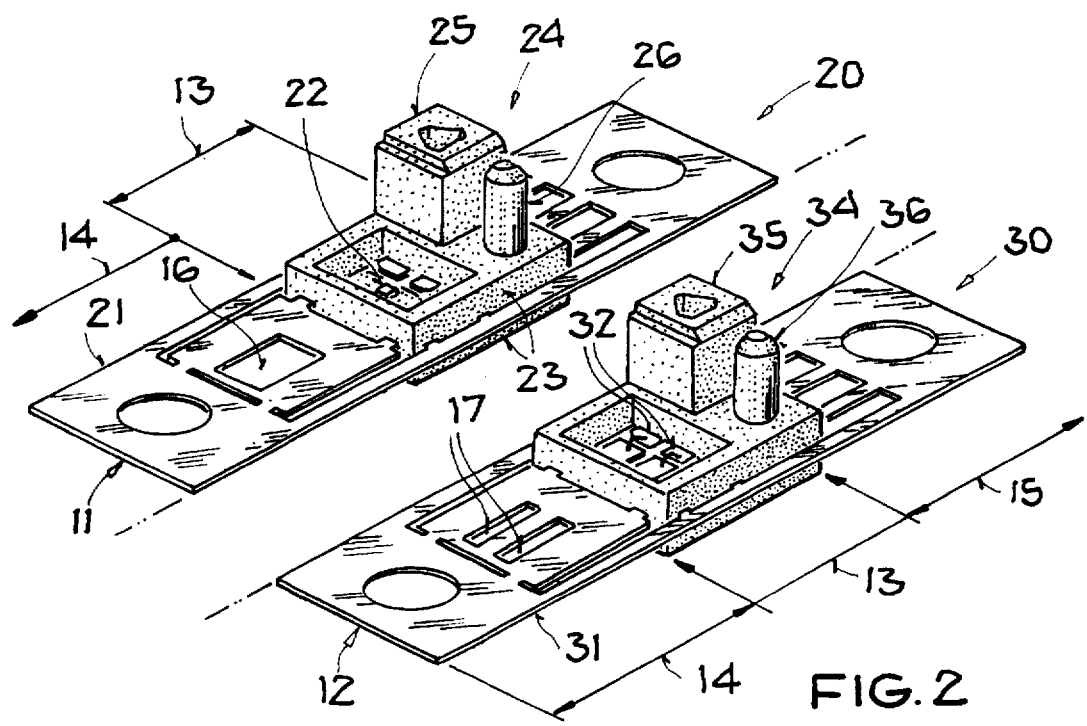
Figure 3:
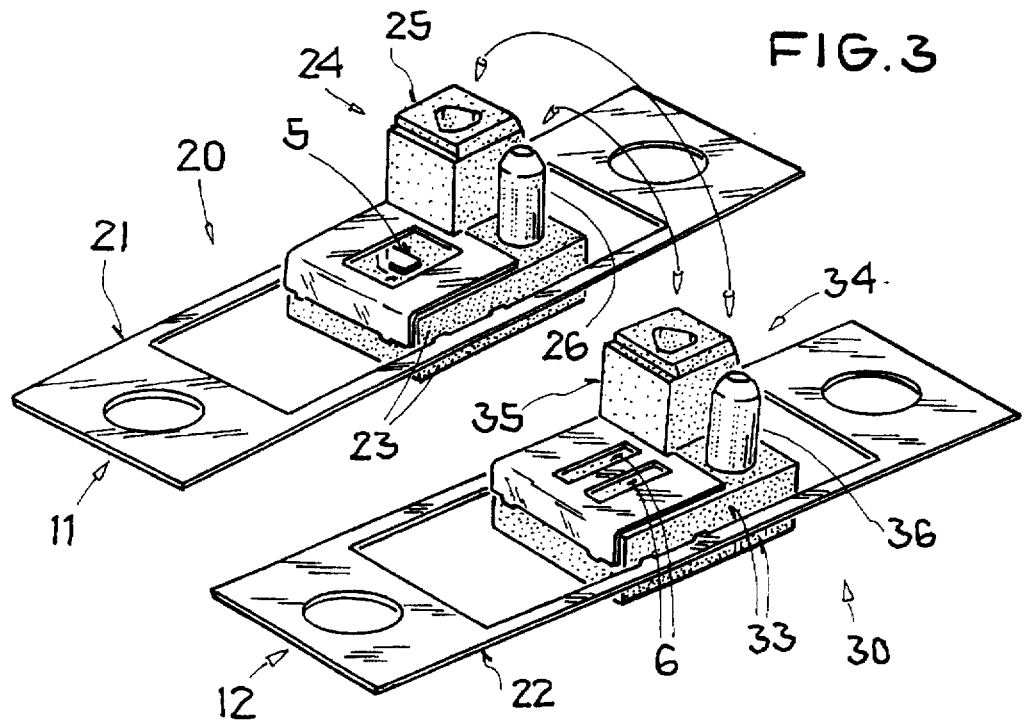
Figure 4:
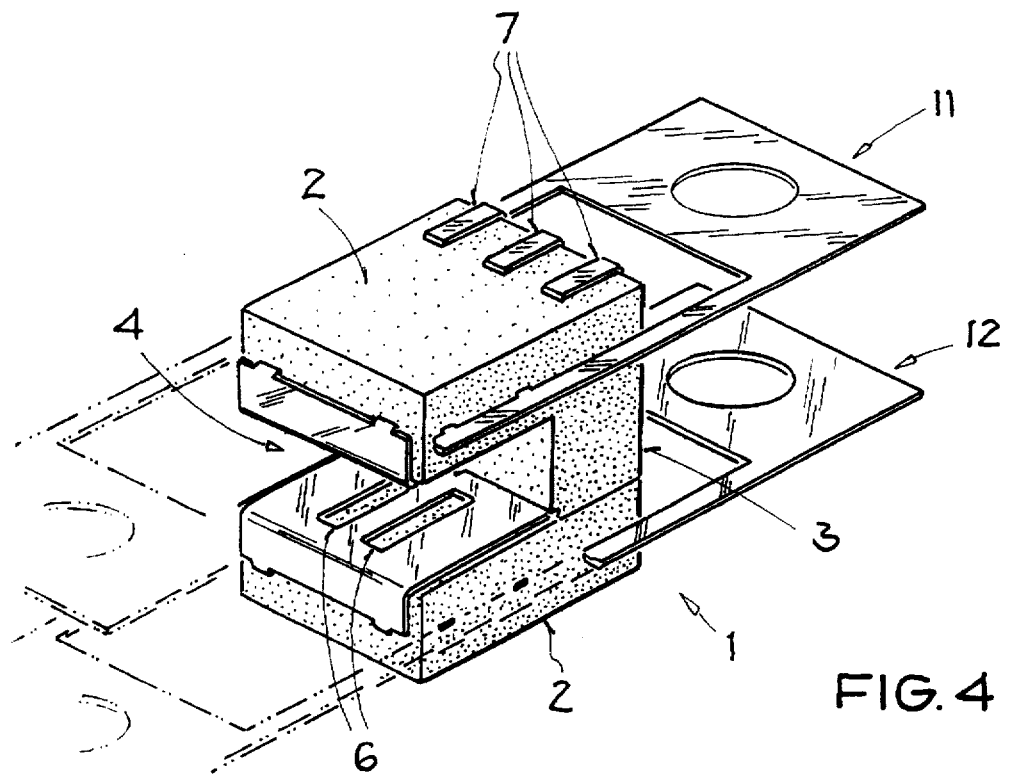
Figure 5:
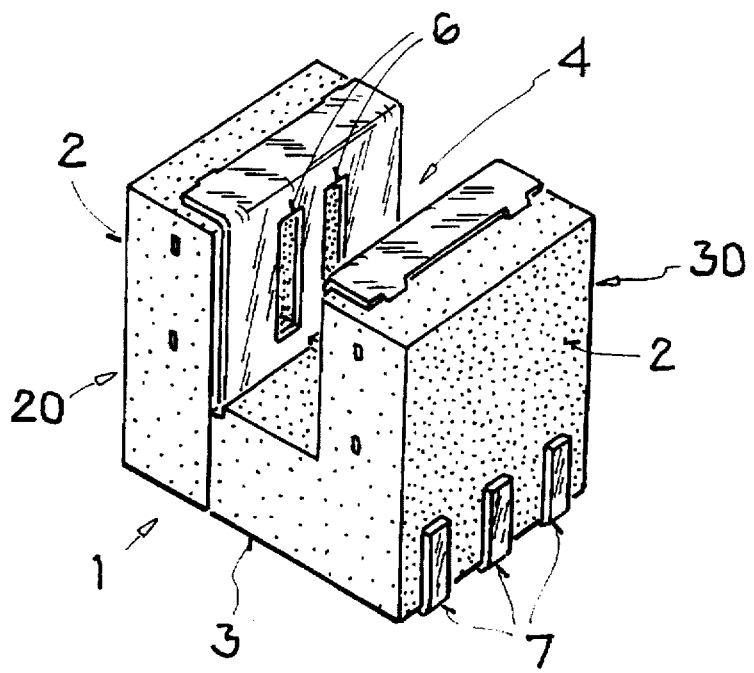
FIGS. 5 and 6 illustrate different versions of the assembled photo interrupter.
Figure 6:
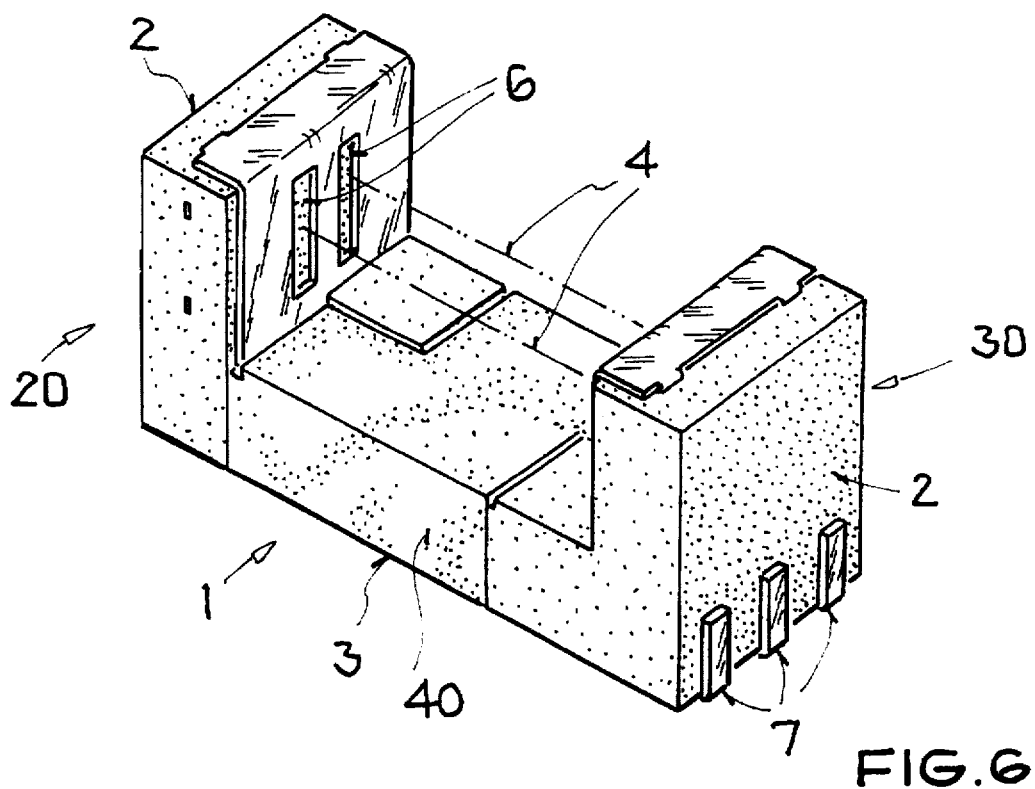

FIG. 1 shows two panels 11, 12 of mounting strip 10, which, respectively, form the carrier unit 21, 22 for respective a housing part 20, 30; a panel 11 of mounting strip 10 is used to form housing part 20 complete with the one transmission element 22; the other panel 12 of mounting strip 10 is used to form housing part 30 complete with the two receiver elements 32. In a centrally located partial area 13, the two carrier units 21, 22 are provided with fittings 19 for receiving semiconductor devices, which semiconductor devices may be designed for instance as SMD components (transmission element 22, receiver elements 32); and in a partial area 14, immediately following the central partial area 13 to one side, these two carrier units 21, 22 are provided with recesses 16, 17 as screen 5 or 6 for the transmission element 22 or the receiver elements 32; and in a partial area 15, immediately following the central partial area 13 to the other side, these two carrier units 21, 22 are provided with strips 18 as contact legs 7 for the photo interrupter 1. FIG. 2 shows the separated panels 11, 12 of mounting strip 10. In the two housing parts 20, 30, SMD semiconductor devices (transmission element 22 of housing part 20 and the two receiver elements 32 of housing part 30) have been mounted onto fittings 19, and the two carrier units 21, 31 in central partial area 13 were encapsulated by a plastic housing material in order to form housing bodies 23, 33. Additionally, one connecting part 24, 34 each—comprising two connection elements 25, 26, 35, 36, designed as plugs 26, 36, or sleeves 25, 35—has been mounted, respectively, on to the two housing bodies 23, 33. According to FIG. 3, the recesses 16, 17 in the second partial area 14 of carrier units 21, 22 have been folded up as screens 5, 6 in front of transmission element 22 or the two receiver elements 32, and strips 18 in the third partial area 14 of carrier units 21, 22 have been bent as contact legs 7 on to the underside of carrier units 21, 22. FIG. 4 shows the two housing parts 20, 30,—assembled by means of connection elements 25, 26, 35, 36 of connecting parts 24, 34—, where, respectively, (as indicated in FIG. 3) plug 26 or 36 of the one housing part 20 or 30 has been inserted into either sleeve 35 or 25 of the respective other housing part 30 or 20. The housing bodies 23, 33 of the two housing parts 20, 30 form the two side surfaces 2 of the photo interrupter 1; the joined connecting parts 24, 34 of the two housing parts 20, 30 form the base area 3 of the photo interrupter 1. On one of the two side surfaces 2 of the photo interrupter 1, the bent contact legs 7 may be recognized. The two panels 11, 12 of mounting strip 10 are also connected with housing bodies 23, 33 of housing parts 20, 30. FIG. 5 shows a sectional view of photo interrupter 1—cut away from mounting strip 10 or panels 11, 12 of mounting strip 10—, complete with side surfaces 2 and base area 3; between the two housing parts 20 and 30, there is the optical transmission path 4 (the gap) which can be influenced in terms of its dimensioning by appropriate selection of connecting parts. FIG. 6 shows a photo interrupter 1 where the optical transmission path 4 (the gap) has been increased by inserting a spacer 40 between the two housing parts 20, 30. The characteristics of photo interrupters I may be varied in many different ways by specifying the number and type of semiconductor devices (number of transmission elements 22 or receiver elements 32, design of semiconductor devices), by selecting the form and design of screens 5, 6 (width, height, etc.), by specifying the optical transmission path 4 or gap width (this is done by specifying the height for the connection elements 25, 26, 35, 36 of connecting parts 24, 34, and thus the base area 3 of photo interrupter 1, or by inserting a spacer 40), as well as by specification of the other dimensions of photo interrupter 1 (side surfaces 2 by selecting housing bodies 22, 32), and by selection of the materials for housing parts 20, 30 of photo interrupter 1. Thus, for example, a photo interrupter 1, operating with infrared light of wavelength 870 nm, has a housing 2, 3—made of a high temperature resistant thermoplastic synthetic material—with dimensions (height×width×depth) of 5 mm×5 mm×5 mm. Mounting strip 10 consists, for example, of copper, and on to this mounting strip, the first housing part 20 complete with an infrared transmission diode 22 as well as the second housing part 30 complete with two infrared receiver diodes 32 have been fitted (with these two receiver diodes as receiver elements, direction decoding will be possible in addition to position detection).

What is claimed is:

1. Photo interrupter comprised of at least one transmission element and at least one receiver element, which are separated from each other by an optical transmission path, and wherein:

the photo interrupter has a modular structure formed from two housing parts which are joined together, each of the two housing parts has a respective carrier unit designed as a panel of a mounting strip, at least one semiconductor device located on the respective carrier unit, and a respective housing body forming one of the two sides surface of the photo interrupter, which housing body encapsulates the respective carrier unit in a first partial area of the carrier unit containing the at least one semiconductor device, at least one semiconductor device of the one housing part is a transmission element, and at least one semiconductor device of the other housing part is a receiver element, at least one of the two housing parts has at least one connecting part, fitted to the housing body and forming the base area of the photo interrupter, by means of which connecting part the two housing parts are joined together, and each of the respective carrier units of the respective housing parts has a second partial area containing a number of recesses corresponding to the number of semiconductor elements located in the respective associated housing part, with the respective second partial area of each carrier unit being bent around a portion of the associated respective housing part so that the respective recesses are positioned in front of the associated respective at least one semiconductor element to form a respective optical screen in the optical transmission path for the respective associated at least one semiconductor element.

2. Photo interrupter according to claim 1 wherein the semiconductor devices are surface mounting device components.

3. Photo interrupter according to claim 1 wherein optical auxiliary devices are integrated into the recesses in the second partial area of at least one carrier unit.

4. Photo interrupter according to claim 1 wherein each carrier unit of the housing parts has a specified number of strips in a third partial area which strips form contact legs, and wherein the strips extend for a distance out from the respective housing bodies or, by bending the third partial area of the carrier unit, are in contact with and fit flush against the respective housing bodies.

5. Photo interrupter according to claim 1 wherein, during manufacturing of the mounting strip, the structure or form design for the partial areas of the carrier unit is uniquely specified.

6. Photo interrupter according to claim 1 wherein, during processing the unstructured mounting strip, the structure or form design for the partial areas of the carrier unit may be variably specified.

7. Photo interrupter according to claim 1 wherein at least one housing part has two semiconductor devices and wherein the two semiconductor devices of the at least one housing part are separated from each other by an optically impermeable partition.

8. Photo interrupter according to claim 1 wherein each of the two housing parts has one connecting part comprising at least one connection element which cooperates with a corresponding connection element on the other housing part to connect the two housing parts together.

9. Photo interrupter according to claim 8 wherein the connecting parts of the two housing parts are of the same design.

10. Photo interrupter according to claim 1 wherein the two housing parts are joined by one of gluing, soldering, or a plug-in connection.

11. Photo interrupter according to claim 1 wherein a spacer is inserted between the two housing parts.

12. Photo interrupter according to claim 1 wherein the optical characteristics of the photo interrupter are varied by the form design for the housing bodies of the two housing parts.

13. Photo interrupter according to claim 1 wherein the optical characteristics of the photo interrupter are varied by utilizing different materials for the housing bodies of the housing parts.

14. Photo interrupter according to claim 13 wherein the housing bodies include at least two different materials.

15. Photo interrupter according to claim 13 wherein the respective housing bodies of the two housing parts are formed of respectively different materials.

16. Photo interrupter according to claim 13 wherein plastic material is used as a base material for the housing bodies of the two housing parts.

* * * * *